(12) United States Patent
Park et al.

(10) Patent No.: US 11,820,327 B2
(45) Date of Patent: Nov. 21, 2023

(54) VEHICLE AND CONTROL METHOD THEREOF

(71) Applicants: Hyundai Motor Company, Seoul (KR); Kia Corporation, Seoul (KR)

(72) Inventors: Min Ha Park, Gyeonggi-do (KR); Seong Hwan Cho, Gyeonggi-do (KP)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/869,423

(22) Filed: Jul. 20, 2022

(65) Prior Publication Data

US 2023/0060470 A1 Mar. 2, 2023

(30) Foreign Application Priority Data

Aug. 31, 2021 (KR) .......................... 10-2021-0115326

(51) Int. Cl.
*B60R 25/102* (2013.01)
*B60R 25/10* (2013.01)
*G07C 9/00* (2020.01)
*B60R 25/24* (2013.01)

(52) U.S. Cl.
CPC ........ *B60R 25/102* (2013.01); *B60R 25/1003* (2013.01); *B60R 25/245* (2013.01); *G07C 9/00309* (2013.01); *G07C 2009/00539* (2013.01)

(58) Field of Classification Search
None
See application file for complete search history.

(56) References Cited

U.S. PATENT DOCUMENTS

| | | | |
|---|---|---|---|
| 10,358,115 B2 * | 7/2019 | Jeong | .................... B60R 25/102 |
| 2014/0203924 A1 * | 7/2014 | Shin | ......................... G08G 1/16 |
| | | | 340/435 |
| 2019/0118768 A1 * | 4/2019 | Jeong | ..................... B60R 25/33 |

\* cited by examiner

*Primary Examiner* — Carlos Garcia
(74) *Attorney, Agent, or Firm* — Fox Rothschild LLP

(57) ABSTRACT

Provided is a vehicle, including: a communicator configured to perform communication with a user terminal or a remote control device; a sensor configured to acquire surrounding information of the vehicle; and a controller including a processor configured to process the surrounding information. The controller is configured to identify a location of the remote control device based on the communication and transmit a warning message to the user terminal when an obstruction is identified between the identified location of the remote control device and a location of the vehicle, based on processing the surrounding information.

19 Claims, 13 Drawing Sheets

VEHICLE AND CONTROL METHOD THEREOF

CROSS-REFERENCE TO RELATED APPLICATION

This application claims, under 35 U.S.C. § 119(a), the benefit of Korean Patent Application No. 10-2021-0115326, filed on Aug. 31, 2021 in the Korean Intellectual Property Office, the disclosure of which is incorporated herein by reference in its entirety.

BACKGROUND

Technical Field

Embodiments of the present disclosure relate to a vehicle and a control method thereof, and more specifically, to a vehicle and a control method thereof that may provide a smart door lock system of the vehicle.

Description of the Related Art

A smart key system may be configured to enable a vehicle door to be opened or closed and may be configured to enable a vehicle to start without physically inserting a key into a key slot of the vehicle or driver's control for operating the vehicle. A smart key such as, e.g., an easy-to-carry, smart card or fob for wireless communication, is currently being used under the existing technologies.

When a driver with a smart key approaches a vehicle, a vehicle door may be automatically unlocked and also ignition may be activated without inserting a key into a key slot or a keyhole through a low frequency (LF) communication and a radio frequency (RF) communication.

Specifically, in a conventional smart key system, when a driver exits a vehicle without locking the vehicle doors, a door lock, a mirror folding, and the like may be performed based on a distance between the vehicle and the smart key.

However, since the conventional smart key systems are configured to lock vehicle doors simply based on a distance between a vehicle and a smart key, even when the vehicle disappears from the view of a driver, the conventional smart key system does not perform a door lock, leaving the vehicle in a dangerous state.

SUMMARY

Objects of the present disclosure provide a vehicle and a control method thereof that may transmit a warning message to a driver with a smart key and/or lock vehicle doors, when an obstruction between the driver and the vehicle is identified based on information acquired by a sensor that detects movement of the smart key and includes a camera, etc.

Additional objects of the present disclosure will be set forth in part in the description which follows and, in part, will be obvious from the description, or may be learned by practice of the disclosure.

According to an exemplary embodiment of the present disclosure, there is provided a vehicle, including: a communicator configured to perform communication with a user terminal or a remote control device; a sensor configured to acquire surrounding information of the vehicle; and a controller comprising a processor configured to process the surrounding information, wherein the controller is configured to identify a location of the remote control device based on the communication, and transmit a warning message to the user terminal when an obstruction is identified between the identified location of the remote control device and a location of the vehicle, based on processing the surrounding information.

The sensor may be configured to further acquire state information of the vehicle, and the controller may be further configured to identify whether doors of the vehicle are locked and whether an engine of the vehicle is stopped, based on processing the state information, and identify the location of the remote control device, in response to the engine being stopped and the doors being unlocked.

The controller may be further configured to identify a movement route of the remote control device based on the communication, and lock the doors of the vehicle, in response to the identified movement route being in a direction away from the vehicle and a strength of the communication being less than a preset strength.

The controller may be further configured to assign a weight according to a size of the obstruction, and lock the doors of the vehicle in response to the weight being greater than a preset value.

The controller may be further configured to identify an object corresponding to the identified location of the remote control device, based on the identified location of the remote control device and the processed surrounding information, and lock the doors of the vehicle, in response to the identified object not being identified due to the obstruction.

The sensor comprise one or more of the following: a camera; a radar sensor; and a lidar sensor, and the sensor may be further configured to acquire the surrounding information of the vehicle.

The controller may be further configured to lock the doors of the vehicle, in response to a state where the strength of the communication is less than the preset strength lasting longer than a predetermined period of time.

The communication may be performed based on at least one of: an ultra wide band (UWB); a Bluetooth low energy (BLE); and a near field communication (NFC).

The controller may be further configured to lock the doors of the vehicle, in response to a response to the warning message not being received from the user terminal for a predetermined period of time.

According to an exemplary embodiment of the present disclosure, there is provided a control method of a vehicle, the control method comprising: performing communication with a user terminal or a remote control device; acquiring, by a sensor, surrounding information of the vehicle; identifying a location of the remote control device based on the communication; identifying an obstruction between the identified location of the remote control device and a location of the vehicle, based on processing the surrounding information; and transmitting a warning message to the user terminal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
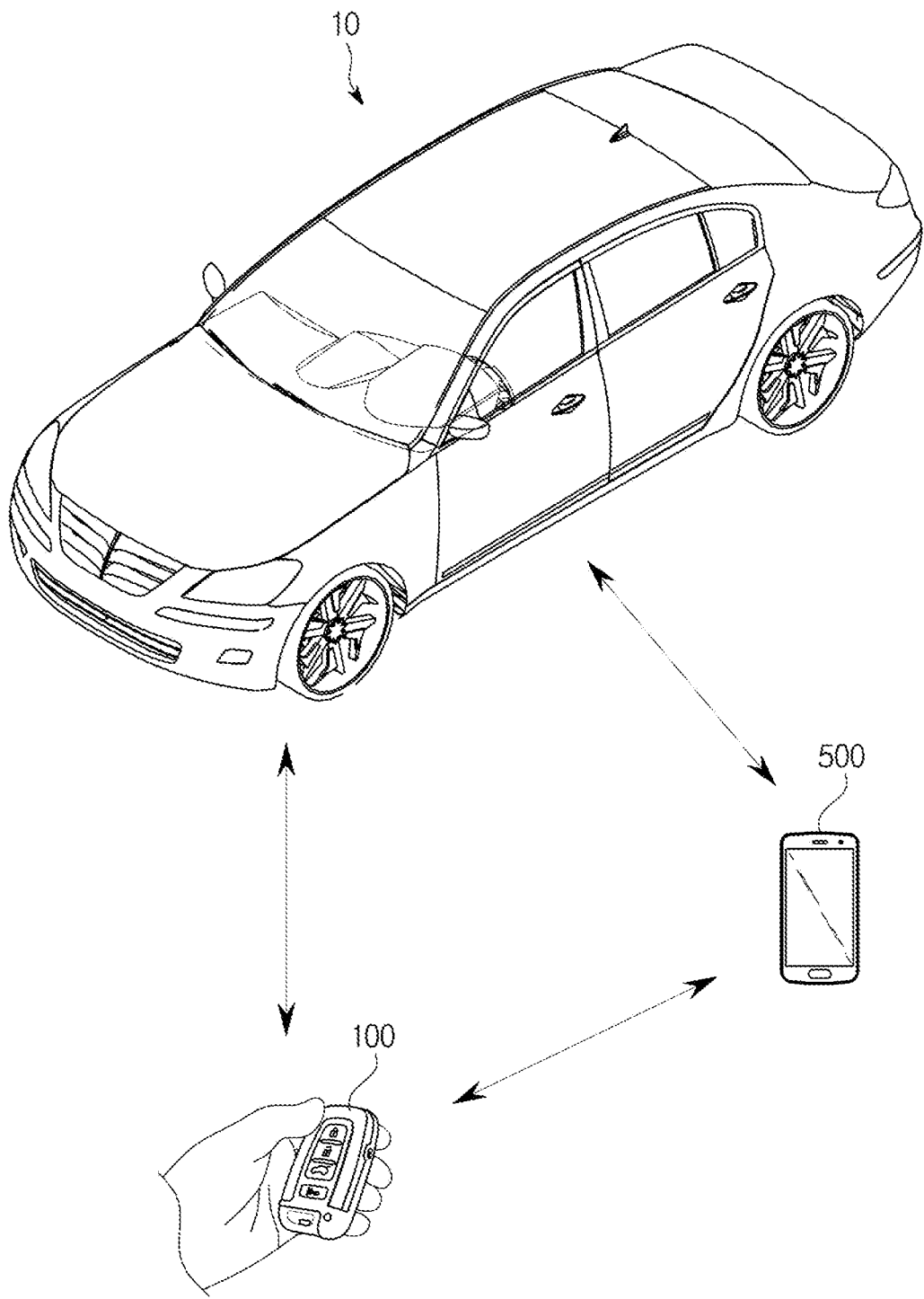
FIG. 1 is a conceptual diagram illustrating a vehicle control system according to an exemplary embodiment.

Like reference numerals throughout the specification denote like elements. Also, this specification does not describe all the elements according to embodiments of the present disclosure, and descriptions well-known in the art to which the disclosure pertains or overlapped portions are omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It is to be understood that the singular forms are intended to include the plural forms as well, unless the context clearly dictates otherwise.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terms such as "part", "—device", "—block", "—member", "module", and the like may refer to a unit for processing at least one function or act. For example, the terms may refer to at least one process processed by at least one hardware, such as field-programmable gate array (FPGA)/application specific integrated circuit (ASIC), at least one software stored in memories or processors.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Reference numerals used for method steps are just used for convenience of explanation, but not to limit an order of the steps. Thus, unless the context clearly dictates otherwise, the written order may be practiced otherwise.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, a vehicle and a control method thereof according to an exemplary embodiment of the present disclosure will be described in detail with reference to the accompanying drawings.

FIG. 1 is a conceptual diagram illustrating a vehicle control system according to an exemplary embodiment.

Referring to FIG. 1, for example, the vehicle control system may include a vehicle 10, a remote control device 100 and a user terminal 500.

The vehicle 10, the remote control device 100 and the user terminal 500 may be connected to each other via network. The network refers to a wired/wireless connection structure to exchange information among nodes such as a terminal and a server. For example, the network may include a $3^{rd}$ generation partnership project (3GPP), a long term evolution (LTE), $5^{th}$ generation (5G) network, a world interoperability for microwave access (WIMAX) network, Internet, local area network (LAN), a wireless local area network (WLAN), a wide area network (WAN), a personal area network (PAN), a ultra wide band (UWB) network, a Bluetooth network, a Bluetooth low energy (BLE), a near field communication (NFC), a satellite broadcast network, an analog broadcast network, a digital multimedia broadcasting (DMB) network, and the like, without being limited thereto.

The vehicle 10 refers to a mode of transportation that may drive on a road. Hereinafter, for convenience of description, a four-wheel vehicle is used as an example to describe the vehicle 10, but the vehicle 10 is not limited thereto. For instance, the vehicle 10 may also include a two-wheel vehicle, a three-wheel vehicle, a movable construction machine, a bicycle, or a motorized bicycle.

The remote control device 100 refers to a device that may control the vehicle 10 inside or outside of the vehicle 10. Also, the remote control device 100 may be configured to control the vehicle 10 in a manner where signals transmitted by a plurality of antennas installed in the vehicle 10 are received and a response signal to the received signal is transmitted. In addition, a user may control the vehicle 10 outside the vehicle 10 using a lock button, a unlock button and a trunk button of the remote control device 100. Further, when the remote control device 100 may be in the vehicle 10, the user may control an ignition on/off operation of the vehicle 10 by clicking an ignition button.

The user terminal 500 refers to a device that may be configured to control the vehicle 10 inside or outside of the vehicle 10 and may be configured to receive a warning message from the vehicle 10. Also, the user terminal 500 may be configured to control the vehicle 10 in a manner where signals transmitted by a plurality of antennas installed in the vehicle 10 are received and a response signal to the received signal is transmitted. In addition, the user terminal 500 may be configured to transmit a control signal for locking doors of the vehicle 10, a control signal for unlocking the doors of the vehicle 10, a control signal for opening a trunk of the vehicle 10, a control signal for igniting an engine of the vehicle 10, and the like. Further, the user terminal 500 may be configured to output the warning message transmitted by the vehicle 10, and also may be configured to transmit/receive various control signals such as the above-described control signals and a standby control signal as a response to the warning message.

For example, the user terminal 500 may include all types of wired/wireless communication device capable of input/output, such as a personal communication system (PCS), a global system for mobile communication (GSM), a personal digital cellular (PDC), a personal handy-phone system (PHS), a personal digital assistant (PDA), an international mobile telecommunication-2000 (IMT-2000), a code division multiple access 2000 (CDMA-2000), a wideband CDMA (W-CDMA), a wireless broadband Internet (Wibro) terminal, a smartphone, a smart pad, a tablet personal computer (PC), a notebook, a wearable device, digital signage, and the like, without being limited thereto.

Meanwhile, for instance, the remote control device 100 may be referred to as a smart key, a digital key, etc. Accordingly, hereinafter, a device for remotely controlling the vehicle 10 such as a smart key will be described as the remote control device 100 for convenience of description.

Meanwhile, it is illustrated in FIG. 1 that the remote control device 100 and the user terminal 500 may be separated in the vehicle control system, but the vehicle control system is not limited thereto. That is, the user terminal 500 may be the same as the remote control device 100, and be separated from the remote control device 100 as shown in FIG. 1. That is, it can be understood that the vehicle 10 and a control method thereof described below may be implemented by including at least one of the remote control device 100 or the user terminal 500.

Also, hereinafter, the remote control device 100 and the user terminal 500 may be separately described in detail, as shown in FIG. 1, for convenience of description.

Figure 2:
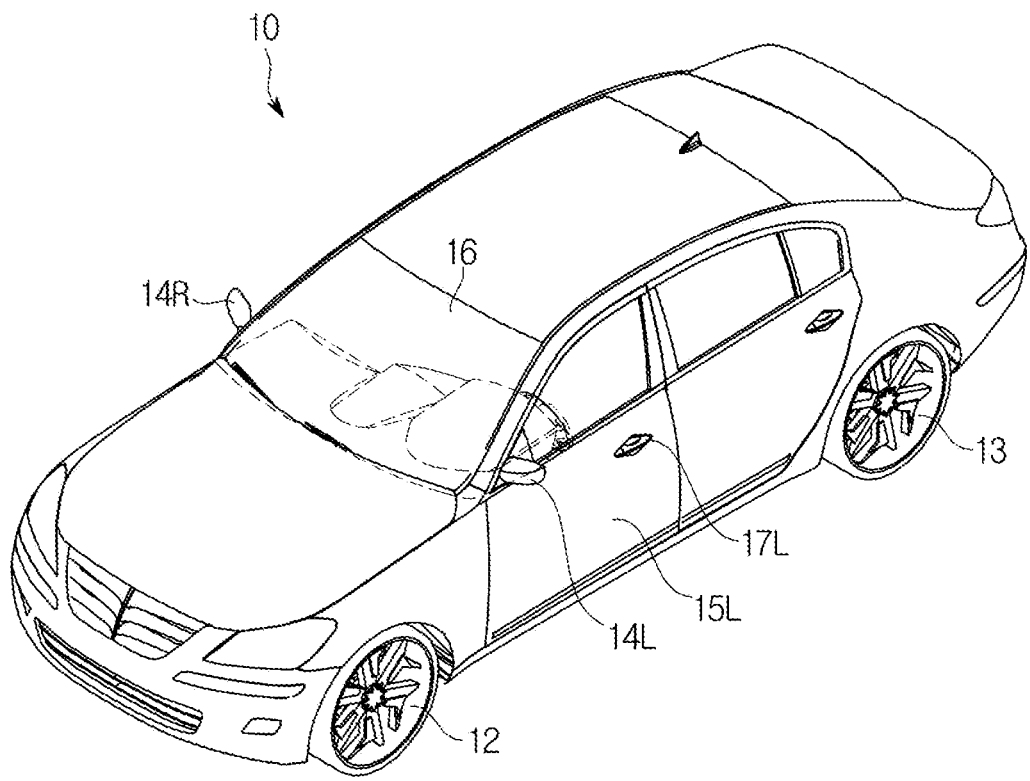
FIG. 2 is a conceptual diagram illustrating an exterior of a vehicle according to an exemplary embodiment.

FIG. 2 is a conceptual diagram illustrating an exterior of the vehicle 10 according to an exemplary embodiment.

Referring to FIG. 2, the exterior of the vehicle 10 according to an exemplary embodiment may include wheels 12 and 13 configured for moving the vehicle 10, a left door 15L configured for shielding an inside of the vehicle 10 from outside, a front window 16 configured for providing a front view of the vehicle 10 to a driver in the vehicle 10, and side mirrors 14L and 14R that may be configured for providing the driver with a rear view of the vehicle 10.

The wheels 12 and 13 may include the front wheel 12 placed on a front side of the vehicle 10 and the rear wheel 13 placed on a rear side of the vehicle 10. A driving device (not shown) provided inside of the vehicle 10 may be configured to provide rotational force to the front wheel 12 or the rear wheel 13 so that the vehicle 10 moves forward or backward. The driving device may be configured to adopt an engine that generates rotational force by burning fossil fuel or a motor that generates rotational force by receiving power from a condenser.

The doors 15L and 15R (refer to FIG. 3) may be movably provided on left and right sides of the vehicle 10 so that the driver or a passenger may get on the vehicle 10 when opened, and the inside of the vehicle 10 is shielded from outside, when closed. Also, a door handle 17L used to open or close the doors 15L and 15R (refer to FIG. 3) may be provided on an exterior surface of the vehicle 10, and an antenna (not shown) may be mounted in the door handle 17L to transmit/receive a communication signal. Although only the door handle 17L on a driver's seat side is illustrated, an antenna (not shown) that may be configured to transmit/receive a communication signal may be mounted in a door handle (not shown) on a passenger's seat side. That is, an antenna (not shown) may be mounted in at least one of the left door handle 17L or a right door handle (not shown). In addition, an antenna (not shown) configured to transmit/receive a communication signal may be mounted in various locations inside the vehicle 10.

When an authentication between the remote control device 100 and the vehicle 10 is completed through a wireless communication network, the doors of the vehicle 10 may be unlocked, and the door 15L may be opened by a user pulling the door handle 17L.

For instance, the authentication between the remote control device 100 and the vehicle 10 may be based on mutual authentication for a unique identifier (ID) stored in the remote control device 100 through communication between the remote control device 100 and the vehicle 10, without being limited thereto.

The front window 16 may be provided on a front upper side of the vehicle 10 so that the driver inside the vehicle 10 may acquire visual information on the front of the vehicle 10, and is also referred to as a windshield glass.

The side mirrors 14L and 14R may include the left side mirror 14L placed on the left side of the vehicle 10 and the right side mirror 14R placed on the right side of the vehicle 10. The side mirrors 14L and 14R may be configured to allow the driver inside the vehicle 10 to acquire visual information on the sides or the rear of the vehicle 10.

In addition to the above, the vehicle 10 may include sensing devices such as a proximity sensor configured to detect nearby obstructions or vehicles on the rear or sides of the vehicle 10, a rain sensor configured to detect whether it rains or the amount of precipitation, a camera, a radar sensor, a lidar sensor, and the like, which will be described in detail later. However, the vehicle is not limited thereto, and the vehicle 10 may further comprise an inner camera capable of identifying occupants inside the vehicle 10, a weight detection sensor, and the like.

Meanwhile, the proximity sensor may be configured to transmit a detection signal to the sides or rear of the vehicle 10 and may be configured to receive a reflected signal reflected from an obstruction such as another vehicle. Based on a waveform of the received reflected signal, the proximity sensor may be configured to detect whether and where the obstruction exists on the sides or rear of the vehicle 10. As an example of the proximity sensor, a method of transmitting ultrasonic waves or infrared rays and detecting a distance to an obstruction using ultrasonic waves or infrared rays reflected from the obstruction may be used. For instance, the proximity sensor may comprise at least one of the radar sensor or the lidar sensor, without being limited thereto.

Figure 3:
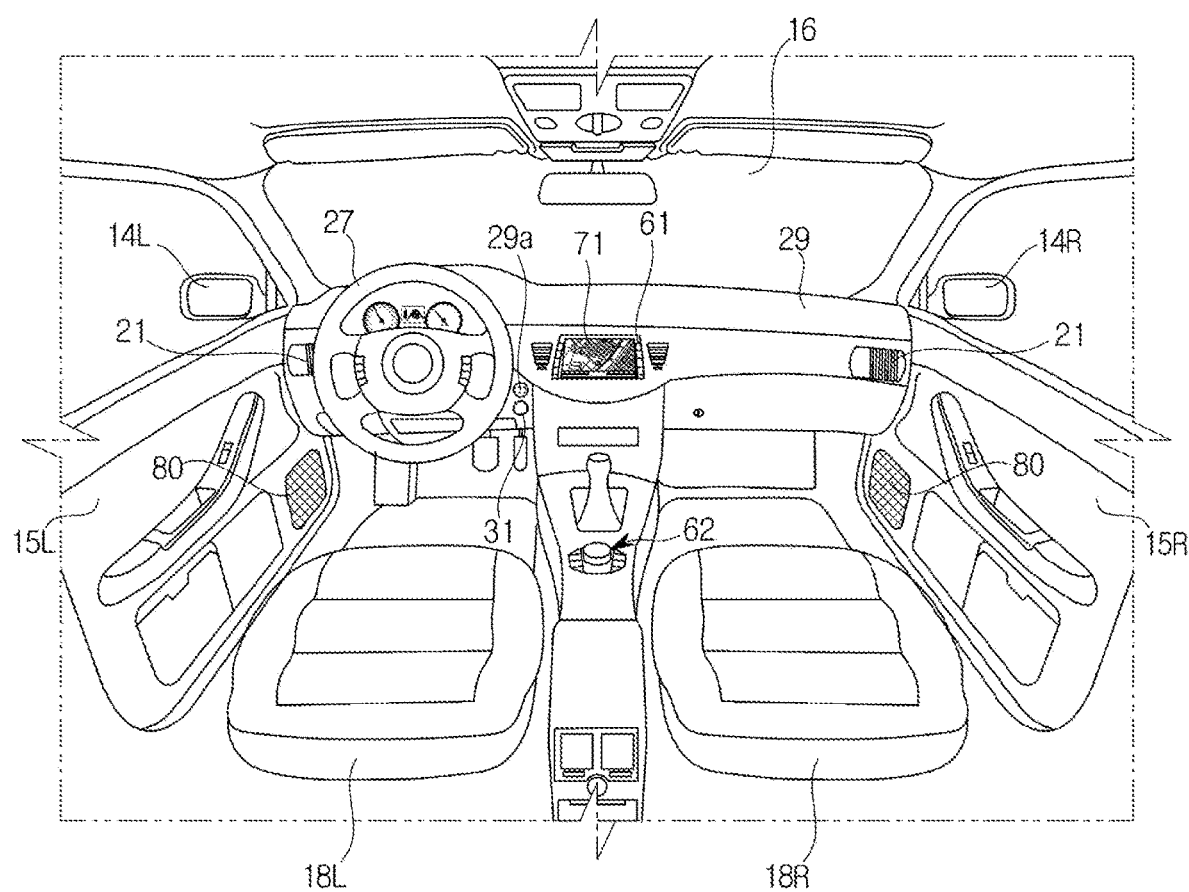
FIG. 3 is a conceptual diagram illustrating an inside of a vehicle according to an exemplary embodiment.

FIG. 3 is a conceptual diagram illustrating an inside of a vehicle according to an exemplary embodiment.

Referring to FIG. 3, an audio video navigation (AVN) display 71 and an AVN inputter 61 may be provided in a central part of a dashboard 29. The AVN display 71 may be configured to selectively display at least one of an audio screen, a video screen or a navigation screen. Also, the AVN display 71 may be configured to display various control screens related to the vehicle 10 or screens related to other additional functions.

The AVN display 71 may be implemented with a liquid crystal display (LCD), a light emitting diode (LED), a plasma display panel (PDP), an organic light emitting diode (OLED), a cathode ray tube (CRT), and the like.

The AVN inputter 61 may be provided as a hard key type to be close to the AVN display 71, and, when the AVN display 71 is implemented as a touch screen type, the AVN inputter 61 may be provided as a touch panel type in front of the AVN display 71.

Also, a center inputter 62 in a jog shuttle type may be provided between a driver seat 18L and a passenger seat 18R. A user may input a control command in a manner that turns, presses, or pushes the center inputter 62 in four directions.

A sound outputter 80 configured to output sound may be provided in the vehicle 10, and the sound outputter 80 may be a speaker. The sound outputter 80 may be configured to output a sound required when an audio function, a video function, a navigation function, and/or other additional functions are performed.

For example, the sound outputter 80 may be provided in the left door 15L and the right door 15R, respectively, and may be provided in other areas such as doors of the rear seat and the dashboard 29, if necessary.

A steering wheel 27 may be provided on the dashboard 29 on the driver seat 18L side, and a keyhole 29a into which the remote control device 100 is insertable may be formed in an area adjacent to the steering wheel 27. When the remote control device 100 is inserted into the keyhole 29a or an authentication between the remote control device 100 and the vehicle 10 is completed through a wireless communication network, the remote control device 100 and the vehicle 10 may be connected to each other.

Also, the dashboard 29 may be provided with a start button 31 for controlling the start of the vehicle 10. When the remote control device 100 is inserted into the keyhole 29a or an authentication between the remote control device 100 and the vehicle 10 is completed through a wireless communication network, an ignition of the vehicle 10 may be turned on by the user pressing the start button 31.

Meanwhile, the vehicle 10 may be provided with an air conditioner configured to perform both heating and cooling, and the heated or cooled air may be discharged through a ventilation exhaust 21 to control an internal temperature of the vehicle 10.

Figure 4:
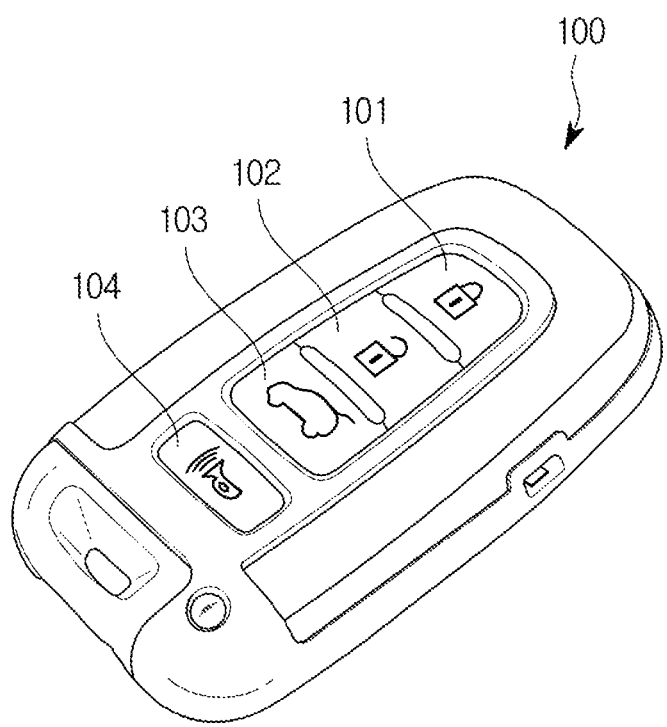
FIG. 4 is a conceptual diagram illustrating an exterior of a remote control device according to an exemplary embodiment.

FIG. 4 is a conceptual diagram illustrating an exterior of the remote control device 100 according to an exemplary embodiment.

Referring to FIG. 4, the remote control device 100 may be configured to directly release a door lock of the vehicle 10 by using a key of the remote control device 100, or may be configured to release the door lock by receiving a control signal from antennas installed in the vehicle 10 and transmitting a response signal. Also, the remote control device 100 may be a fob key enabling the vehicle 10 to start and drive, when the remote control device 100 is in the vehicle 10. The remote control device 100 may be provided with a hard key 101 configured for locking all doors of the vehicle 10, a hard key 102 configured for releasing the door lock, a hard key 103 configured for unlocking a trunk 91, and a hard key 104 configured for instructing the vehicle 10 to sound a horn. However, the remote control device 100 is not limited to the configuration shown in FIG. 4, and other hard keys, buttons, etc., may be provided for performing various functions. Accordingly, the above-described functions of the hard keys may be replaced with a user's touch, including a touchable display.

Also, the remote control device 100 according the exemplary embodiment of FIG. 4 may comprise any input device capable of controlling the vehicle 10 such as unlocking the doors of the vehicle 10, starting or driving the vehicle 10, and the like, in addition to the fob key. For instance, when a mobile device functions as a smart key, the remote control device 100 of the disclosure may include the mobile device. In this case, because an application enabling the mobile device to function as the remote control device 100 may be installed in the mobile device, a mobile device with the application installed may be sold or the application may be downloaded from a server after the sale.

In addition, an authentication procedure may be performed so that the mobile device is operated as the remote control device 100 for the vehicle 10. The remote control device 100 may be sold together with the vehicle 10, and authentication information for connection with the vehicle 10 may be stored in advance. In this case, it can be understood that the user terminal 500 described above may be the mobile device.

Figure 5:
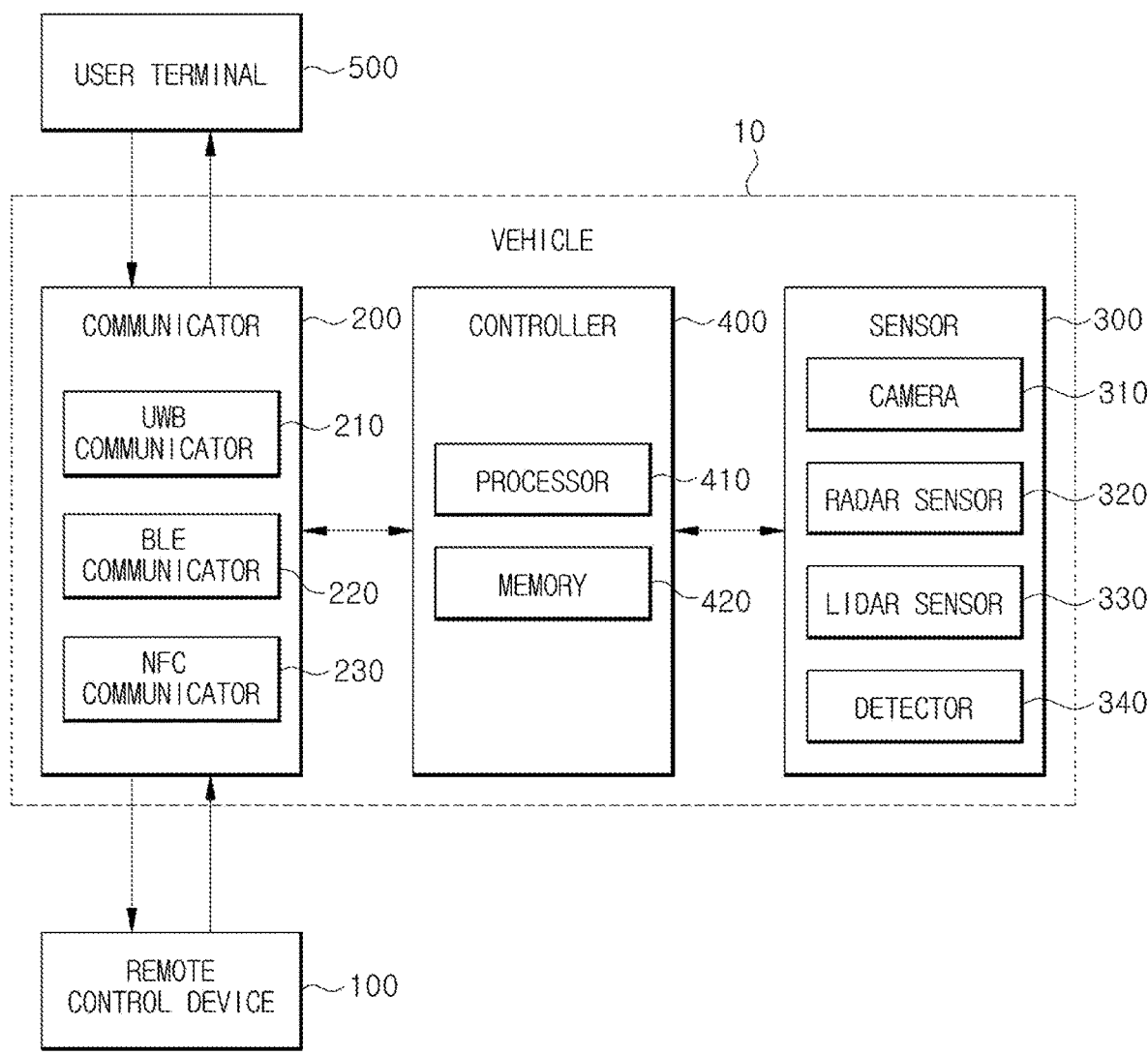
FIG. 5 is a block diagram illustrating a configuration of a vehicle control system according to an exemplary embodiment.

FIG. 5 is a block diagram illustrating a configuration of a vehicle control system according to an exemplary embodiment.

Referring to FIG. 5, the vehicle control system according to an exemplary embodiment may comprise the vehicle 10, the remote control device 100, and/or the user terminal 500.

The vehicle 10 may comprise a communicator 200, a sensor 300, and/or a controller 400. The communicator 200 may be configured to perform communication with the user terminal 500 or the remote control device 100, the sensor 300 may be configured to acquire surrounding information and/or state information of the vehicle 10, and the controller 400 may be configured to process the surrounding information and/or the state information of the vehicle 100. Meanwhile, the communicator 200 and the sensor 300 of the vehicle 10 may be electrically connected to the controller 400. For example, the communicator 200 and the sensor 300 may be connected to the controller 400 via a vehicle communication network (NT) or via a hard wire. Also, the communicator 200 and the sensor 300 may be configured to transmit sensing data and/or communication data to the controller 400.

The communicator 200 may include at least one of a UWB communicator 210 configured for performing UWB communication, a BLE communicator 220 configured for performing BLE communication, or an NFC communicator 230 configured for performing NFC communication.

The UWB communication is one of a wireless communication method that may be configured to transmit/receive data by spreading a signal with an ultra-wideband frequency of 1 GHz range, and also may be configured to detect a location of a communication medium (e.g. the remote control device 100 and/or the user terminal 500) based on the communication data (a transmission signal and a receiving signal).

Also, when including at least one of the UWB communicator 210, the BLE communicator 220 or the NFC communicator 230, the communicator 200 may be provided with an antenna (not shown) corresponding thereto. For example, when including the UWB communicator 210 only, the communicator 200 may be provided with an antenna for UWB communication, without being limited thereto.

According to another exemplary embodiment, the communicator 200 may comprise a low frequency (LF) communicator (not shown) and a radio frequency (RF) communicator (not shown). The LF communicator may be configured to transmit/receive a low frequency (LF) signal, and the RF communicator may be configured to transmit/receive a radio frequency (RF) signal to/from the remote control device 100 and/or the user terminal 500. Here, the LF signal may be a wireless signal having a low frequency of 120 kHz or more and 135 kHz or less. Also, the RF signal may be a wireless signal having an ultra-high frequency (UHF) of 315 kHz or more and 433 kHz or less.

In addition, the communicator 200 may comprise a memory configured for storing a program and data configured for performing modulation/demodulation, and a processor configured for performing modulation/demodulation of a communication signal according to the program and data stored in the memory. Accordingly, the communicator 200 may be configured to transmit/receive the LF signal, the RF signal, an ultra-wideband signal, and the like, to/from the remote control device 100 and/or the user terminal 500 to transmit/receive a control signal related to the vehicle 10 or confirm unique ID information.

The communicator 200 may be configured to periodically transmit a search signal. Here, the search signal may refer to a communication signal transmitted by the vehicle 10 in a vicinity (within a communicable distance) of the vehicle 10 in order to identify whether the remote control device 100 and/or the user terminal 500 are within a communicable range.

According to at least one of the UWB communicator 210, the BLE communicator 220 or the NFC communicator 230 included in the communicator 200, the communicator 200 may comprise a communication interface including a receiver configured to receive a communication signal and a communication port that is configured to connect the remote control device 100 and a corresponding communication network. Also, the communicator 200 may further comprise a communication signal conversion module configured to demodulate the communication signal received through the communication interface to the control signal under control of the controller 400.

The communicator 200 may be configured to receive a search response signal of the remote control device 100 and/or the user terminal 500 in response to the search signal of the vehicle 10. The search response signal may refer to a communication signal transmitted by the remote control device 100 to the vehicle 10, so that the vehicle 10 may confirm that the remote control device 100 receives the search signal from the vehicle 10.

As described above, the communication signal may be transmitted by changing formats of the search signal for searching for the remote control device 100 and/or the user terminal 500 and the search response signal, according to at least one of the UWB communicator 210, the BLE communicator 220 or the NFC communicator 230 included in the communicator 200.

For instance, the search signal and the search response signal may have different formats.

Meanwhile, the communicator 200 may comprise at least one antenna (not shown) configured to communicate with the remote control device 100 and/or the user terminal 500 via the at least one antenna. Here, as described above, it may be understood that the antenna (not shown) may refer to the receiver included in the communication interface.

Also, the communicator 200 may be configured to transmit the communication signal with the remote control device 100 and/or the user terminal 500 to the controller 400.

Meanwhile, the controller 400 may be configured to identify a location of the remote control device 100 and/or the user terminal 500 based on communication data including the search signal and the search response signal received from the communicator 200.

More specifically, the controller 400 may be configured to identify the location of the remote control device 100 more accurately, based on each search signal and search response signal received from each of the communicators 210, 220, 230, and etc., of the communicator 200 which use different frequency bands. According to another exemplary embodiment, the UWB communication may be configured to consume less power, enable high speed communication, and have high accuracy of position detection, but the speed may be limited as a distance increases. Accordingly, when a communication distance between the vehicle 10 and the remote control device 100 is short, the controller 400 may be configured to communicate with the remote control device 100 through the UWB communicator 210, but when the communication distance increases, communication may be performed through the BLE communicator 220, without being limited thereto.

Meanwhile, as described above, it can be understood that the remote control device 100 and/or the user terminal 500 may comprise the communication interface configured to communicate with the communicator 200.

A camera 310, a radar sensor 320, a lidar sensor 330 and the controller 400 may be configured to assist driving of the vehicle 10 integrally. For instance, the camera 310, the radar sensor 320, the lidar sensor 330 and the controller 400 may be configured to integrally provide a lane departure warning (LDW), a lane keeping assist (LKA), a high beam assist (HBA), an autonomous emergency braking (AEB), a traffic sign recognition (TSR), an adaptive cruise control (ACC), a blind spot detection (BSD), and the like.

The camera 310, the radar sensor 320, the lidar sensor 330 and the controller 400 may be separately provided. For example, the controller 400 may be installed in a housing separated from a housing of the camera 310, a housing of the radar sensor 320, and a housing of the lidar sensor 330. The controller 400 may be configured to transmit/receive data to/from the camera 310, the radar sensor 320 and the lidar sensor 330 through an ultra-wide band network.

Figure 6:
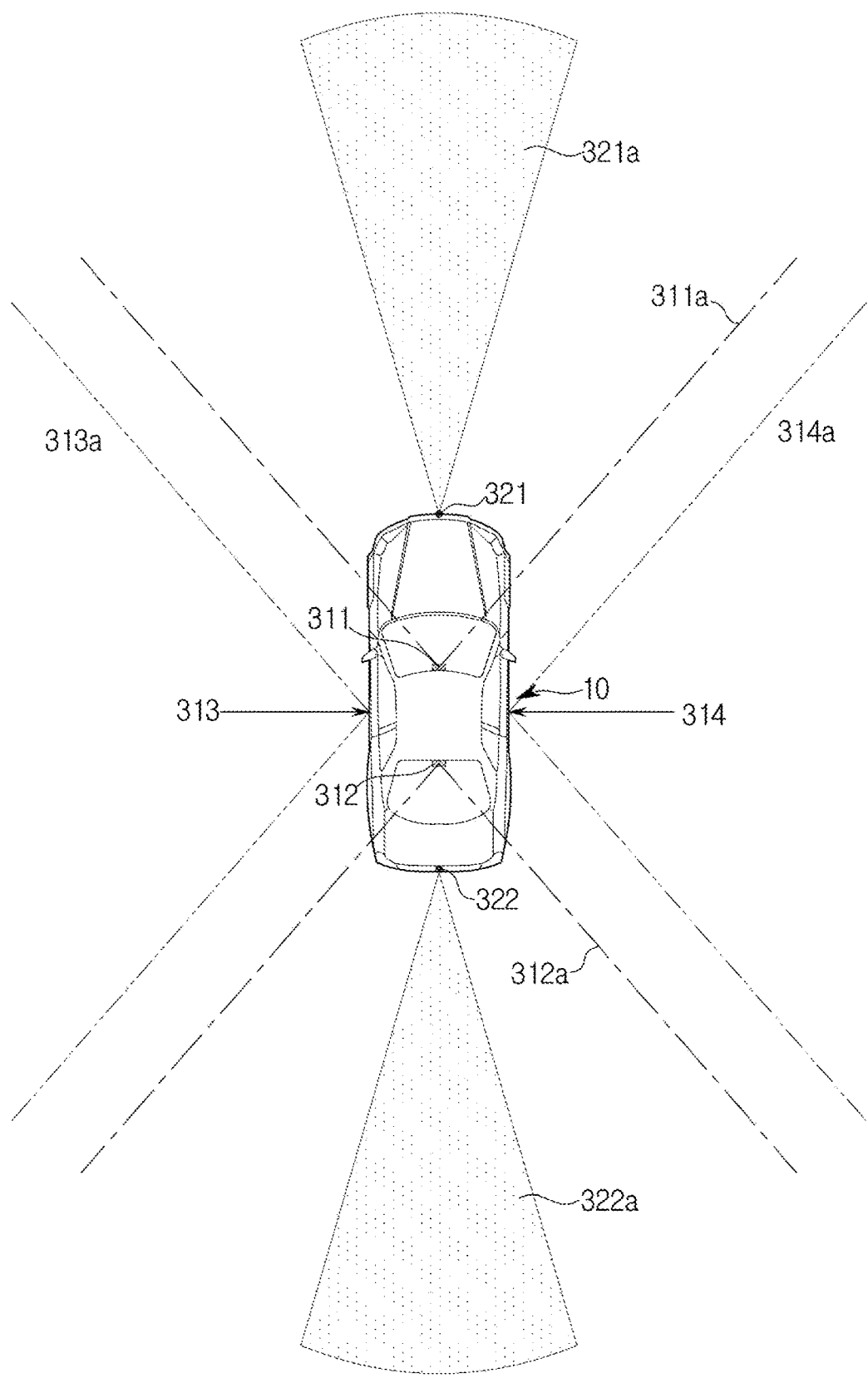
FIG. 6 is a conceptual diagram illustrating fields of view of cameras and radars included in a vehicle according to an exemplary embodiment.

FIG. 6 is a conceptual diagram illustrating fields of view of cameras and radars included in a vehicle according to an exemplary embodiment.

Referring to FIG. 6, the camera 310 may comprise a front camera 311, a rear camera 312, a left camera 313 and a right camera 314.

The front camera 311 may have a field of view 311*a* facing the front of the vehicle 10. For example, the front camera 311 may be installed on a front windshield of the vehicle 10, without being limited thereto.

The rear camera 312 may have a field of view 312*a* facing the rear of the vehicle 10, and the left camera 313 and the right camera 314 may have fields of view 313*a* and 314*a* facing the left and right sides of the vehicle, respectively. For example, the cameras 311, 312, 313 and 314 may be installed anywhere in the vehicle 10.

The camera 310 may comprise a plurality of lenses and/or image sensors. The image sensors may comprise a plurality of photodiodes configured to convert light into an electrical signal, and the plurality of photodiodes may be arranged in a two-dimensional (2D) matrix.

The camera 310 may be configured to photograph surroundings of the vehicle 10, and may be configured to acquire surrounding image data of the vehicle 10. The surrounding image data of the vehicle 10 may comprise information about other vehicles, pedestrians, cyclists, lanes (markers for distinguishing the lanes) or obstructions located around the vehicle 10. Also, the surrounding image data of the vehicle 10 may comprise information about free space where the vehicle 10 may drive.

The camera 310 may be electrically connected to the controller 400. For instance, the camera 310 may be connected to the controller 400 via a vehicle communication network (NT) or via a hard wire. The camera 310 may be configured to transmit image data of the front of the vehicle 10 to the controller 400.

The controller 400 may be configured to process the image data received from the camera 310, and may be configured to identify other vehicles, pedestrians, cyclists, lanes (markers for distinguishing the lanes) or free space located in front of the vehicle 10.

The radar sensor 320 may comprise a front radar sensor 321, a rear radar sensor 322, a left radar sensor (not shown) and a right radar sensor (not shown).

As shown in FIG. 6, the front radar sensor 321 may have a field of sensing 321*a* facing the front of the vehicle 10. For example, the front radar sensor 321 may be installed in a grille or a bumper of the vehicle 10. Also, the rear radar sensor 322 may have a field of sensing 322*a* facing the rear of the vehicle 10. Meanwhile, although not illustrated in FIG. 6, the radar sensor 320 may further comprise the left and right radar sensors in order to acquire surrounding radar sensing data of the vehicle 10. For instance, the radar sensors 321, 322, etc., may be installed in a conventionally known position and/or a position to be developed later in order to acquire surrounding radar sensing data of the vehicle 10.

The radar sensor 320 may comprise a transmission antenna (or a transmission antenna array) configured to transmit a transmission wave toward a vicinity of the vehicle 10, and a receiving antenna (or a receiving antenna array) configured to receive a reflected wave reflected from an object. The radar sensor 320 may be configured to acquire radar data from the transmission wave transmitted by the transmission antenna and the reflected wave received by the receiving antenna. The radar data may comprise a relative location and a relative speed of the other vehicles, pedestrians or cyclists located in front of the vehicle 10. The radar sensor 320 may be configured to calculate a relative distance to the object based on a phase difference (or a time difference) between the transmission wave and the reflected wave, and may be configured to calculate the relative speed of the object based on a frequency difference between the transmission wave and the reflected wave.

Accordingly, the radar sensor 320 may be configured to identify a movement direction and a movement route of the object around the vehicle 10, without being limited thereto.

For instance, the radar sensor 320 may be connected to the controller 400 via an NT, a hard wire, or a printed circuit board. The radar sensor 320 may be configured to transmit the radar data to the controller 400.

The controller 400 may be configured to process the radar data received from the radar sensor 320, and may be configured to identify a relative location and a relative speed of the other vehicles, pedestrians or cyclists located around the vehicle 10 and/or an obstruction from the radar data.

For example, the lidar sensor 330 may have fields of view facing all directions around the vehicle 10, and may be installed on a roof of the vehicle 10.

The lidar sensor 330 may comprise a light source (e.g. a light emitting diode, a light emitting diode array, a laser diode, or a laser diode array) configured to emit light (e.g. infrared ray), and a light receiver (e.g. a photodiode or a photodiode array) configured to receive light reflected from the object. Also, the lidar sensor 330 may further comprise a driving device configured for rotating the light source and the light receiver, if required. While rotating, the lidar sensor 330 may be configured to emit light and receive the light reflected from the object, and thereby may receive lidar data. The lidar data may comprise a relative location and a relative speed of the other vehicles, pedestrians or cyclists located around the vehicle 10, and/or a location of the obstruction.

For instance, the lidar sensor 330 may be connected to the controller 400 via an NT, a hard wire, or a printed circuit board. The lidar sensor 330 may be configured to transmit the lidar data to the controller 400.

For example, a detector 340 may include various types of sensors installed in the vehicle 10. Specifically, the detector 340 may include a weight sensor installed in the seats of the vehicle configured to identify whether an occupant is in the seat of the vehicle 10, an electromagnetic sensor that may be configured to detect opening and/or closing of the doors of the vehicle 10, a motion detection sensor that may be configured to detect a movement inside the vehicle 10, a global positioning system (GPS) sensor that may be configured to acquire location data of the vehicle 10, and the like.

For instance, the detector 340 may further comprise a vibration sensor configured for detecting turn-on and/or turn-off of an engine of the vehicle 10, without being limited thereto. According to another exemplary embodiment, the controller 400 may be configured to identify a state of the engine through the start button 31 of the vehicle 10, or based on whether an engine and/or a motor of the driving device of the vehicle 10 is driven.

For example, surrounding information of the vehicle 10 acquired by the sensor 300 may refer to data received from at least one of the camera 310, the radar sensor 320 or the lidar sensor 330. Also, as an example, state information of the vehicle 10 may refer to sensing data acquired by the detector 340.

The controller 400 may comprise a processor 410 and a memory 420.

The processor 410 may be configured to process the image data, the radar data and the lidar data, and output a control signal for controlling the communicator 200, the doors 15L and 15R and the side mirrors 14L and 14R, as well as the driving device, a braking device, a steering device, a display device and an audio device of the vehicle 10. For example, the processor 410 may comprise an image processor, a digital signal processor (DSP), and/or a micro control unit (MCU).

The processor 410 may be configured to identify a nearby object of the vehicle 10 based on the image data, the radar data and the lidar data. Specifically, the processor 410 may be configured to identify an obstruction (a building) located around the vehicle 10, and may be configured to identify a distance between the vehicle 10 and the identified obstruction and a size of the obstruction. Also, the processor 410 may be configured to provide a weight to the identified obstruction based on the identified size of the obstruction. More specifically, as the size of the obstruction increases, the obstruction may reduce a driver's field of view toward the vehicle 10, so when the vehicle 10 deviates from the driver's field of view, it may be for controlling the vehicle 10.

That is, the processor 410 may be configured to generate a control signal for locking the doors 15 of the vehicle 10, in response to the identified size of the obstruction between the remote control device 100 and the vehicle 10 being greater than a preset value. For example, the preset value may be a value obtained empirically or experimentally, and be a value set based on a driver's height and an angle of a driver's visible area, without being limited thereto.

The processor 410 may be configured to identify a relative location (a distance from the vehicle and an angle to a driving direction) and a type (e.g. whether the object is another vehicle, a pedestrian or a cyclist) of a nearby object of the vehicle 10, based on the image data. The processor 410 may be configured to identify the relative location and relative speed of the nearby object of the vehicle 10, based on the radar data and the lidar data. Also, the processor 410 may be configured to match the object identified based on the radar data with the object identified based on the image data and the object identified based on the lidar data, and, based on the matching result, acquire the type, the relative location and the relative speed of the nearby objects of the vehicle 10.

The processor 410 may be configured to identify more accurate information about the object located around the vehicle 10, in proportion to the number of data types used, among at least one of the image data, the radar data or the lidar data.

For instance, the processor 410 may be configured to identify data on the nearby object more accurately, in proportion to the type of the data used (image data, the radar data and the lidar data) and a weight of each of the sensors.

More specifically, the processor 410 may be configured to assign weights to the image data, the radar data and the lidar data based on a surrounding environment of the vehicle 10, and adjust the weight of the data used. For example, the surrounding environment may include weather such as rain and/or day/night, and the like.

For instance, when the surrounding environment of the vehicle 10 corresponds to a night, a boundary between a nearby object and a background in surrounding image data acquired by the camera 310 may be ambiguous, and thus the processor 410 may be configured to provide a higher weight to the radar data and/or the lidar data than the image data, and identify the nearby object of the vehicle 10 based on the above.

Also, the processor 410 may be configured to reset the weights of the image data, the radar data and the lidar data, based on a distance between the vehicle 10 and the identified nearby object. For example, because the lidar sensor 330 is specialized in identifying an object located at approximately 30 m to 200 m, and when identifying an object within approximately 30 m, a reliability of the lidar data may be relatively low. Accordingly, the processor 410 may be configured to reset the weights of the image data, the radar data and the lidar data, based on the distance between the vehicle 10 and the identified nearby object.

Meanwhile, the processor 410 may be configured to estimate a location of the vehicle 10 using a high-definition (HD) map, the image data, the radar data and the lidar data. Here, the HD map may be stored in the memory 420. For example, the processor 410 may be configured to identify distances to a plurality of landmarks on the HD map, based on the lidar data, and identify an absolute location of the vehicle 10 on the HD map based on the distances to the plurality of landmarks.

In addition, the processor 410 may be configured to project the nearby object of the vehicle on the HD map based on the image data, the radar data and the lidar data. That is, the processor 410 may be configured to project the nearby object and the location of the vehicle 10 on the HD map, based on the absolute location of the vehicle 10 and the relative location of the identified nearby object of the vehicle 10.

Meanwhile, the processor 410 may be configured to acquire communication data with the remote control device 100 received from the communicator 200 and identify a location of the remote control device 100 based on processing of the communication data. Specifically, the processor 410 may be configured to identify a relative location of the remote control device 100 with respect to the vehicle 10, based on a communication signal including a search signal transmitted by the communicator 200 to the remote control device 100 and a search response signal received from the remote control device 100. Also, the processor 410 may be configured to project the identified location of the remote control device 100 on the HD map.

The processor 410 may be configured to generate a control signal for controlling the doors and/or the side mirrors 14 of the vehicle 10, based on the location of the vehicle 10 and the location of the remote control device 100 projected on the HD map, and based on a distance between the remote control device 100 and the vehicle 10.

Meanwhile, the processor 410 may be configured to identify an object corresponding to the identified location of the remote control device 100 and track the object, based on the identified location of the remote control device 100, the image data acquired from the camera 310 and/or the radar data acquired from the radar sensor 320 and/or the lidar data acquired from the lidar sensor 330.

That is, the processor 410 may be configured to match the location of the remote control device 100 projected on the HD map with the nearby object identified based on processing sensing data acquired from the sensor 300. For example, the matching described above may refer to identifying the object corresponding to the location of the remote control device 100, without being limited thereto.

In other words, because the object (e.g. a person) corresponding to the location of the remote control device 100 may be highly likely to be a driver, the processor 410 may be configured to identify the driver by matching the location of the remote control device 100 with the nearby object identified based on the surrounding information of the vehicle 10. However, when the driver may not be identified due to an obstruction located between the vehicle 10 and the remote control device 100, the processor 410 may be configured to generate a control signal for controlling the vehicle 10. That is, when the vehicle 10 is out of the driver's field of view, the doors of the vehicle may be locked even when the distance between the vehicle 10 and the remote control device 100 is less than a preset distance. The preset distance may be a distance determined empirically or experimentally, and may refer to a limit distance that may be understood as the vehicle 10 being in an unsafe state, without being limited thereto.

Accordingly, the processor 410 may be configured to transmit a warning message to the user terminal 50, based on the locations of the remote control device 100, the vehicle 10 and the nearby object projected on the HD map. For instance, the warning message may comprise a warning about an opening of the doors of the vehicle 10 as a distance between the driver and the vehicle 10 increases, without being limited thereto. Also, the warning message is not limited to its form. For instance, the warning message may comprise various forms such as vibration of the user terminal 50, a text message and/or output of a display.

When a nearby object is identified between the vehicle 10 and the remote control device 100, the vehicle 10 may not be seen by the driver even when the distance between the vehicle 10 and the remote control device 100 is shorter than the preset distance. Accordingly, the vehicle 10 may be in an unsafe state, and thus the processor 410 may be configured to generate a control signal for controlling the communicator 200 to transmit the warning message to the user terminal 500 and/or the remote control device 100 in order to prevent the vehicle 10 from being in an unsafe state.

In addition, the processor 410 may be configured to identify whether the doors of the vehicle 10 are locked and/or an engine of the vehicle 10 is stopped, based on processing state information of the vehicle 10 acquired from the sensor 300. For example, the state information of the vehicle 10 may refer to information acquired from the detector 340 of the sensor 300.

That is, the processor 410 may be configured to identify whether the doors 15 of the vehicle are open, the side mirrors 14 are folded, an occupant exists in the vehicle 10, and/or the engine of the vehicle 10 is turned on, based on sensing data acquired from the detector 340. For instance, the processor 410 may be configured to identify whether an occupant including a driver is present in the vehicle 10, based on the sensing data of at least one of the weight sensor or the motion detection sensor included in the detector 340. Here, the weight sensor may be configured to detect weights of the seats of the vehicle 10 and the motion detection sensor may be configured to detect movement inside the vehicle 10.

Accordingly, the processor 410 may be configured to identify whether the doors of the vehicle 10 are locked and/or the engine is stopped, based on processing the sensing data acquired from the detector 340. Also, the processor 410 may be configured to identify the location of the remote control device 100, in response to the engine being stopped and the doors 15 being unlocked.

That is, when the engine of the vehicle 10 is stopped, it may be predicted with high reliability that the vehicle 10 is stopped, and when the doors 15 of the vehicle 10 are unlocked, the vehicle 10 is in an unsafe state. The processor 410 may be configured to identify the location of the remote control device 100 based on communication with the remote control device 100 in order to prevent the vehicle 10 from being in an unsafe state. Accordingly, the processor 410 may be configured to identify an obstruction (nearby object) that may block the driver's field of view between the vehicle 10 and the identified location of the remote control device 100, and may be configured to provide the warning message to the user terminal 500, in response to the obstruction being identified.

Meanwhile, the processor 410 may be configured to control the communicator 200 to periodically transmit a search signal and receive a search response signal. Accordingly, the processor 410 may be configured to identify a movement route based on a change in the location of the remote control device 100 based on a periodic communication signal.

Also, the processor 410 may be configured to identify a movement direction of the remote control device 100 based on the identified movement route of the remote control device 100. Specifically, for example, the processor 410 may be configured to identify the movement direction based on a movement of the remote control device 100 during at least one period, on a basis of the period of the search signal and the search response signal transmitted/received by the communicator 200.

The processor 410 may be configured to generate a control signal for controlling the communicator 200 to transmit the warning message to the user terminal 500, in response to the identified movement direction being away from the vehicle 10 and a strength of the communication with the remote control device 100 being less than a preset strength. Also, the processor 410 may be configured to generate a control signal for locking the doors 15 of the vehicle in response to a state where the strength of the communication with the remote control device 100 is less than the preset strength lasting longer than a predetermined period of time. Here, the predetermined period of time may refer to a period of time during which the communication is highly likely to cut off, and may be a value set empirically or experimentally.

Also, in response to the warning message being transmitted to the user terminal 500, the processor 410 may be configured to generate a control signal for locking the doors 15 of the vehicle and/or a control signal for folding the side mirrors 14, based on a response to the warning message not being received from the user terminal 500 for a predetermined period of time. For example, the response to the warning message may include a control signal for the driver to control the vehicle 10 through the user terminal 50. That is, the response to the warning message may include the control signal for locking the doors 15 of the vehicle 10, the control signal for folding the side mirrors 14, and/or the control signal for maintaining an unlock state of the doors 15 for a period of time input by the user. However, the response to the warning message is not limited thereto.

Meanwhile, the processor 410 and/or the controller 400 are not limited to generating the control signal for controlling the communicator 200 to transmit the warning message to the user terminal 500 based on processing the data. According to another exemplary embodiment, the processor 410 and/or the controller 400 may be configured to generate the control signal for controlling the lock/unlock of the doors 15 of the vehicle 10 and/or folding of the side mirrors 14.

The memory 420 may be configured to store a program and/or data for the processor 410 to process the image data, a program and/or data for the processor 410 to process the radar data, and a program and/or data for the processor 410 to generate the control signal for locking/unlocking the doors 15 of the vehicle 10 and folding the side mirrors 14. Also, the memory 420 may be configured to store the HD map.

The memory 420 may be configured to temporarily store the image data received from the camera 310, the radar data received from the radar sensor 320, and/or processing results of the image data and/or the radar data of the processor 410.

The memory 420 may comprise a volatile memory such as a static random access memory (S-RAM), a dynamic random access memory (D-RAM), and the like, and a non-volatile memory such as a read only memory (ROM), an erasable programmable read only memory (EPROM), and the like.

As described above, the controller 400 may be configured to generate the control signal for controlling the lock/unlock of the doors 15 of the vehicle 10 and the control signal for controlling the folding of the side mirrors 14, based on the image data received from the camera 310 and/or the radar data received from the radar sensor 320 and/or the lidar data received from the lidar sensor 330.

Figure 7:
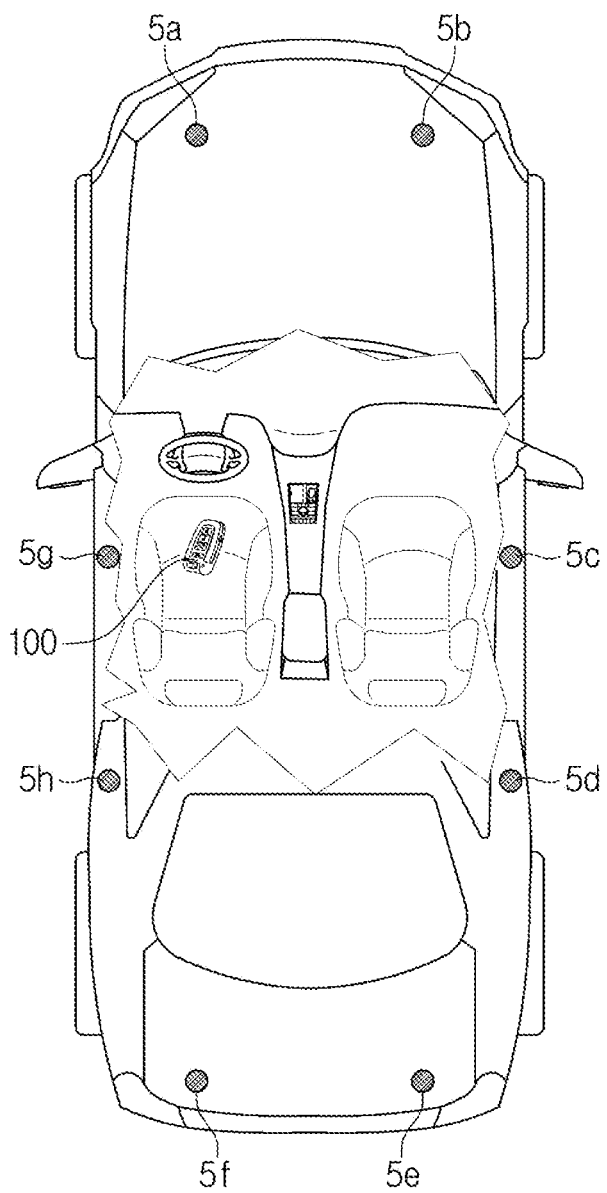
FIG. 7 is a conceptual diagram illustrating a communicator of a vehicle according to an exemplary embodiment.

FIG. 7 is a conceptual diagram illustrating the communicator 200 of the vehicle 10 according to an exemplary embodiment.

Figure 8:
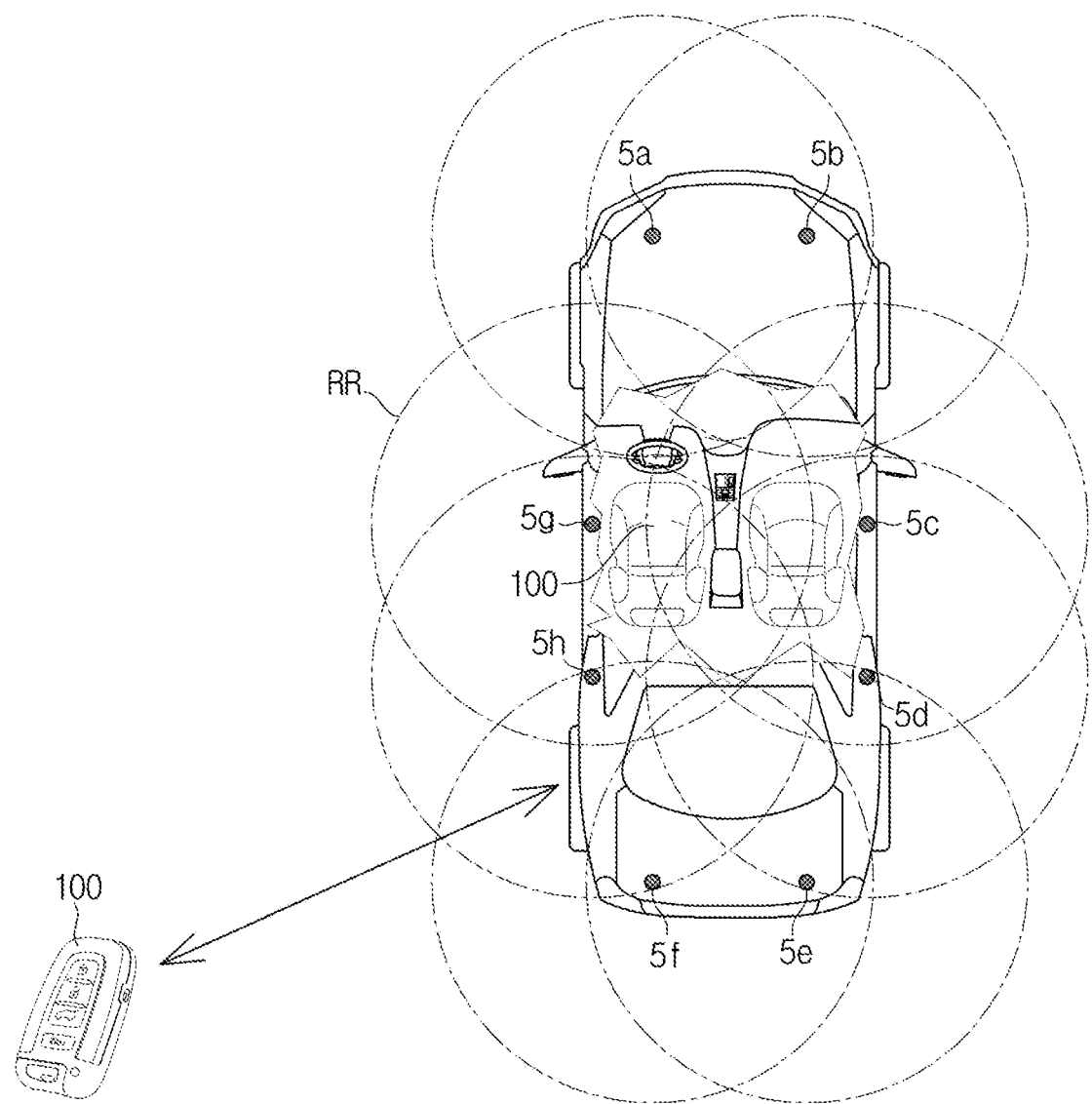
FIG. 8 is a conceptual diagram illustrating a location detection area of a communicator of a vehicle according to an exemplary embodiment.

Also, FIG. 8 is a conceptual diagram illustrating a communicable area (communicable range) RR of the communicator 200 of the vehicle 10 according to an exemplary embodiment.

Hereinafter, referring to FIGS. 7 and 8, a case when the remote control device 100 is located inside the vehicle 10 or within the communicable area RR with the vehicle 10 is described.

The controller 400 may be configured to identify whether the remote control device 100 is located inside the vehicle 10 or within the communicable area RR with the vehicle 10. Specifically, as shown in FIG. 7, the controller 400 may be configured to identify whether the remote control device 100 is present inside the vehicle 10 through a receiving strength of a communication signal transmitted by antennas 5a, 5b, 5c, 5d, 5e, 5f, 5g and 5h installed in the vehicle 10. For instance, when communication signals transmitted by all the antennas from 5a to 5h installed in the vehicle are received through the communicator 200 at a constant strength, the controller 400 may be configured to identify that the remote control device 100 is located inside the vehicle 10.

Also, the controller 400 may be configured to identify whether the remote control device 100 is within the communicable area RR with the vehicle 10 based on whether the communication signals transmitted by the antennas from 5a to 5h installed in the vehicle 10 are received. As shown in FIG. 8, when the remote control device 100 is outside the communicable area RR of the communication signals transmitted by the antennas from 5a to 5h installed in the vehicle 10, the controller 400 may be configured not to receive the communication signals through the communicator 200. Accordingly, the controller 400 may be configured to identify whether the remote control device 100 is within the communicable area RR with the vehicle 10.

When it is identified that the remote control device 100 is located in the vehicle 10, the controller 400 may be configured to generate a control signal for controlling the doors 15 and/or the side mirrors 14 of the vehicle 10, based on a location of the user terminal 500 through communication with the user terminal 500. More specifically, the controller 400 may be configured to identify opening/closing of the doors 15 of the vehicle 10 based on state information of the vehicle 10, and when it is identified that the remote control device 100 is in the vehicle 10 even when an occupant does not exist inside the vehicle 10, the controller 400 may be configured to identify the location of the user terminal 500 based on communication with the user terminal 500, and control the vehicle 10 based on the identified location of the user terminal 500. As described above, it can be understood that the above-described control operation may be applicable in the same way as controlling the doors 15 and/or the side mirrors 14 of the vehicle 10, and/or transmission of a warning message, based on various criteria such as a movement route and a movement direction of the remote control device 100, whether a distance between the vehicle 10 and the remote control device 100 is greater than a predetermined distance, whether an obstruction between the remote control device 100 and the vehicle 10 is identified, a size of the obstruction, and the like.

Meanwhile, as shown in FIGS. 7 and 8, the communicable area RR is illustrated based on each of the antennas from 5a to 5h as an example, but is not limited thereto. According to another exemplary embodiment, the communicable area RR may be determined based on the distance between the vehicle 10 and the remote control device 100 in order to control the doors 15 and/or the side mirrors 14 of the vehicle 10. That is, when communication is performed based on the UWB communicator 210, a communicable area may be wide due to characteristics of UWB communication network, the communicable area RR may be set based on a preset distance where the vehicle 10 may be recognized as being in an unsafe state based on the distance between the vehicle 10 and the remote control device 100. That is, the communicable area RR is not limited to the term.

Hereinafter, for convenience of description, a range generated based on the preset distance used to control the doors 15 and/or the side mirrors 14 of the vehicle 10 is described as the communicable area RR.

Figure 9:
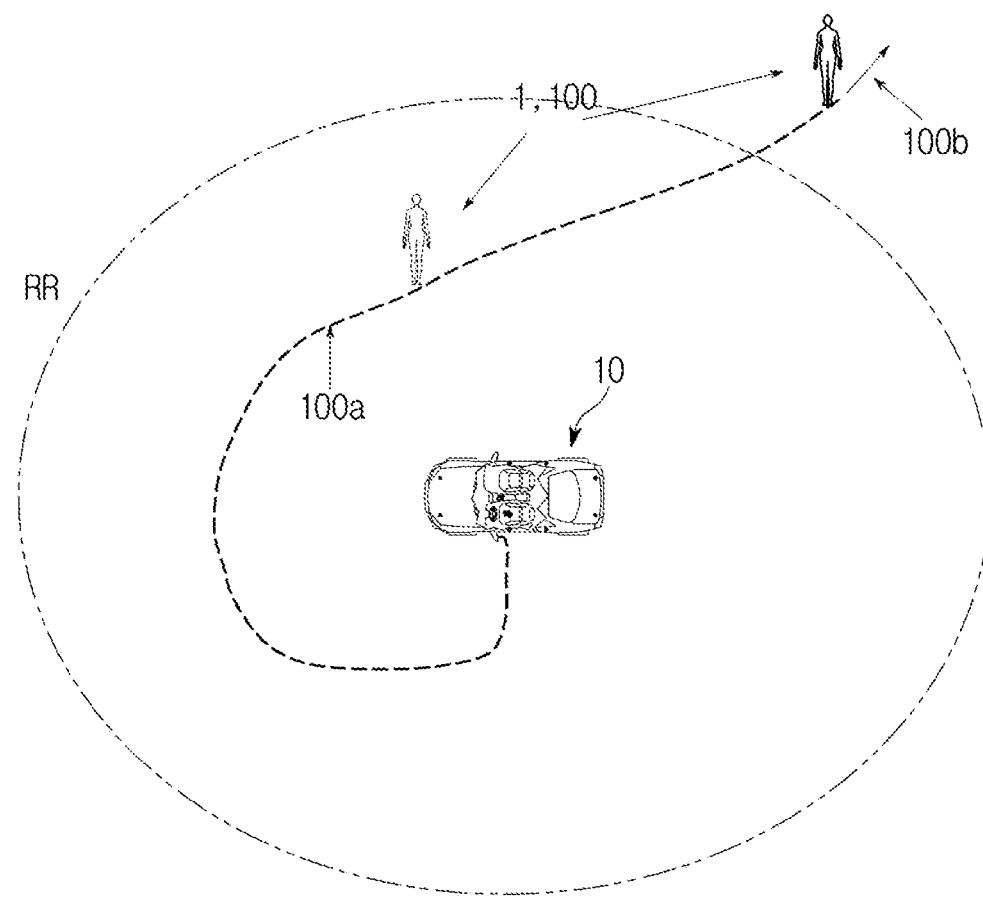
FIG. 9 is a conceptual diagram illustrating a mechanism of controlling a door lock of a vehicle according to an exemplary embodiment.

FIG. 9 is a conceptual diagram illustrating a mechanism of controlling a door lock of a vehicle according to an exemplary embodiment.

Referring to FIG. 9, the controller 400 may be configured to acquire state information of the vehicle 10 from the detector 340 included in the sensor 300. Accordingly, the controller 400 may be configured to identify whether the doors 15 are open, an engine of the vehicle 10 is turned on, the doors 15 are locked, and/or an occupant is present in the vehicle 10, based on the state information of the vehicle 10.

When it is identified that a driver 1 gets off the vehicle 100, the doors 15 may be unlocked and occupants are not present in the vehicle 10 based on processing the state information, the controller 400 may be configured to identify a location of the remote control device 100 based on communication data with the remote control device 100. Accordingly, the controller 400 may be configured to identify a movement route 100*a* and/or a movement direction 100*b* of the driver 1 based on the location of the remote control device 100.

When it is identified that the remote control device 100 and/or the driver 1 are deviating from the communicable area RR based on the identification of the location of the remote control device 100 and/or the driver 1, the controller 400 may be configured to generate a control signal for transmitting a warning message to the user terminal 500 or a control signal for controlling the doors 15 and/or the side mirrors 14 of the vehicle 10.

Also, when it is identified that the movement direction 100*b* of the driver 1 and/or the remote control device 100 is away from the vehicle 10 and the driver 1 and/or the remote control device 100 are out of the communicable area RR, the controller 400 may be configured to generate the control signal for transmitting the warning message to the user terminal 500 or the control signal for controlling the doors 15 and/or the side mirrors 14 of the vehicle 10.

In addition, in response to the movement direction 100*b* of the driver 1 and/or the remote control device 100 being away from the vehicle 10 and a strength of communication between the remote control device 100 and the vehicle 10 being less than a preset strength, the controller 400 may be configured to generate the control signal for transmitting the warning message to the user terminal 500 or the control signal for controlling the doors 15 and/or the side mirrors 14 of the vehicle 10.

Meanwhile, it can be understood that the controller 400 may be configured to generate the control signal for controlling the vehicle 10 by dividing the communicable area RR based on the distance from the vehicle 10.

More specifically, the communicable area RR may be generated based on a preset distance, as described above. That is, the controller 400 may be configured to generate a first communicable area to an n$^{th}$ communicable area according to the preset distance. Also, the vehicle 10 may be controlled differently depending on a range of the communicable area. For example, when a radius of 50 m around the vehicle 10 is set as the first communicable area and a radius of 50 m to 100 m around the vehicle 10 is set as a second communicable area, and when it is identified that the driver 1 and/or the remote control device 100 are in the first communicable area, the controller 400 may be configured to transmit the warning message for warning unlock of the doors 15 of the vehicle to the user terminal 500. Also, when it is identified that the driver 1 and/or the remote control device 100 are in the second communicable area, the controller 400 may be configured to generate a control signal for locking the doors 15 of the vehicle 10 and/or a control signal for folding the side mirrors 15, without being limited thereto.

Meanwhile, FIG. 9 is a conceptual diagram illustrating an example where the driver 1 with the remote control device 100 gets off the vehicle 10 according to an exemplary embodiment. According to another exemplary embodiment, it can be understood that the remote control device 100 shown in FIG. 9 may be replaced with the user terminal 500 when the driver 1 leaves the remote control device 100 inside the vehicle 10 and gets off the vehicle 10.

Figure 10:
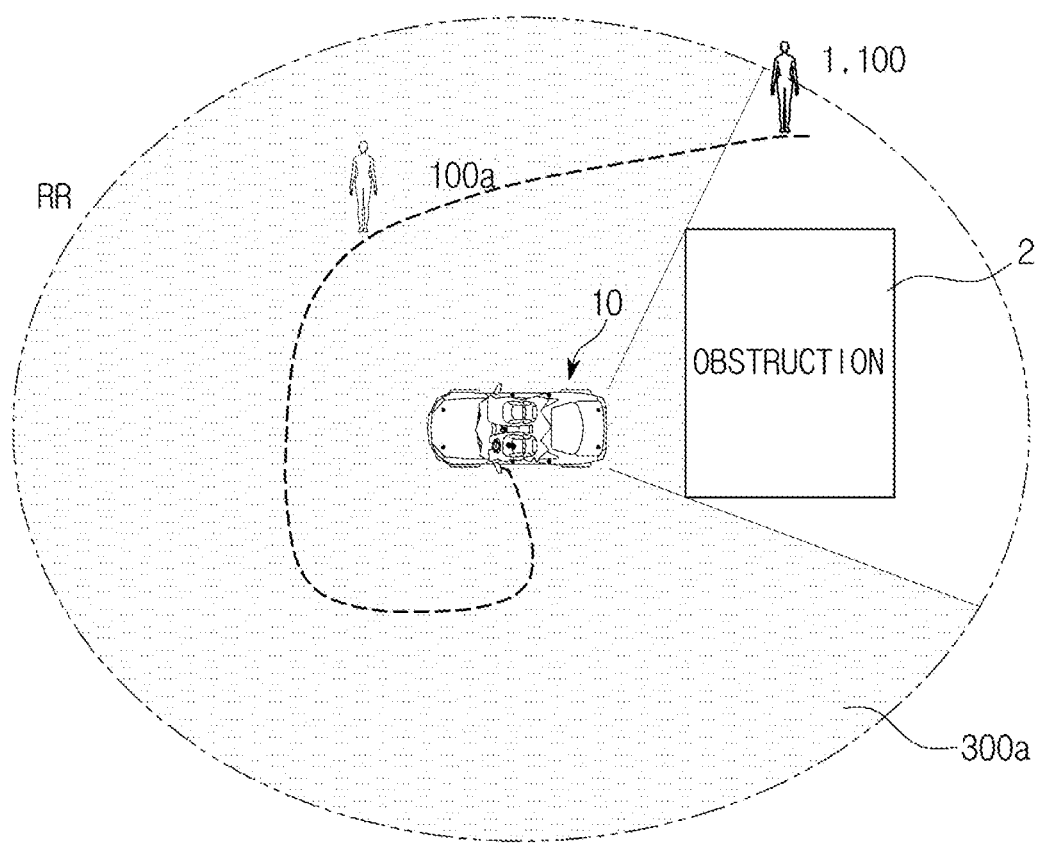
FIG. 10 is a conceptual diagram illustrating a mechanism of controlling a door lock of a vehicle according to an exemplary embodiment.

FIG. 10 is a conceptual diagram illustrating a mechanism of controlling a door lock of a vehicle according to an exemplary embodiment.

The controller 400 may be configured to identify an obstruction 2 around the vehicle 10 based on sensing data (image data, radar data, lidar data, etc.) received from the sensor 300. A radio wave of the radar sensor 320 and/or a laser of the lidar sensor 330 may be configured not to be transmitted depending on a type of the obstruction 2. Accordingly, when the obstruction 2 is identified between an identified location of the driver 1 and/or the remote control device 100 and the vehicle 10 based on the sensing data, the controller 400 may be configured to generate a control signal for controlling the vehicle 10.

More specifically, the controller 400 may be configured to identify a nearby object (the driver 1) based on processing the sensing data received from the sensor 300, and track the driver 1 by matching the location of the remote control device 100 with the nearby object based on communication. However, when the obstruction 2 is identified between the driver 1 and the vehicle 10, the driver 1 may not be tracked due to the obstruction 2, which indicates that the vehicle disappears from a field of view of the driver 1. Accordingly, it may be identified that the vehicle is in an unsafe state.

Therefore, the controller 400 may be configured to identify a tracking area 300*a* where the driver 1 may be tracked based on the sensing data within the communicable area RR, and when the driver 1 and/or the remote control device 100 are out of the tracking area 300*a*, the controller 400 may be configured to generate a control signal for locking the doors 15 of the vehicle 10 and/or a control signal for folding the side mirrors 14, even when the driver 1 and/or the remote control device 100 are within the communicable area RR, without being limited thereto.

Figure 11A:
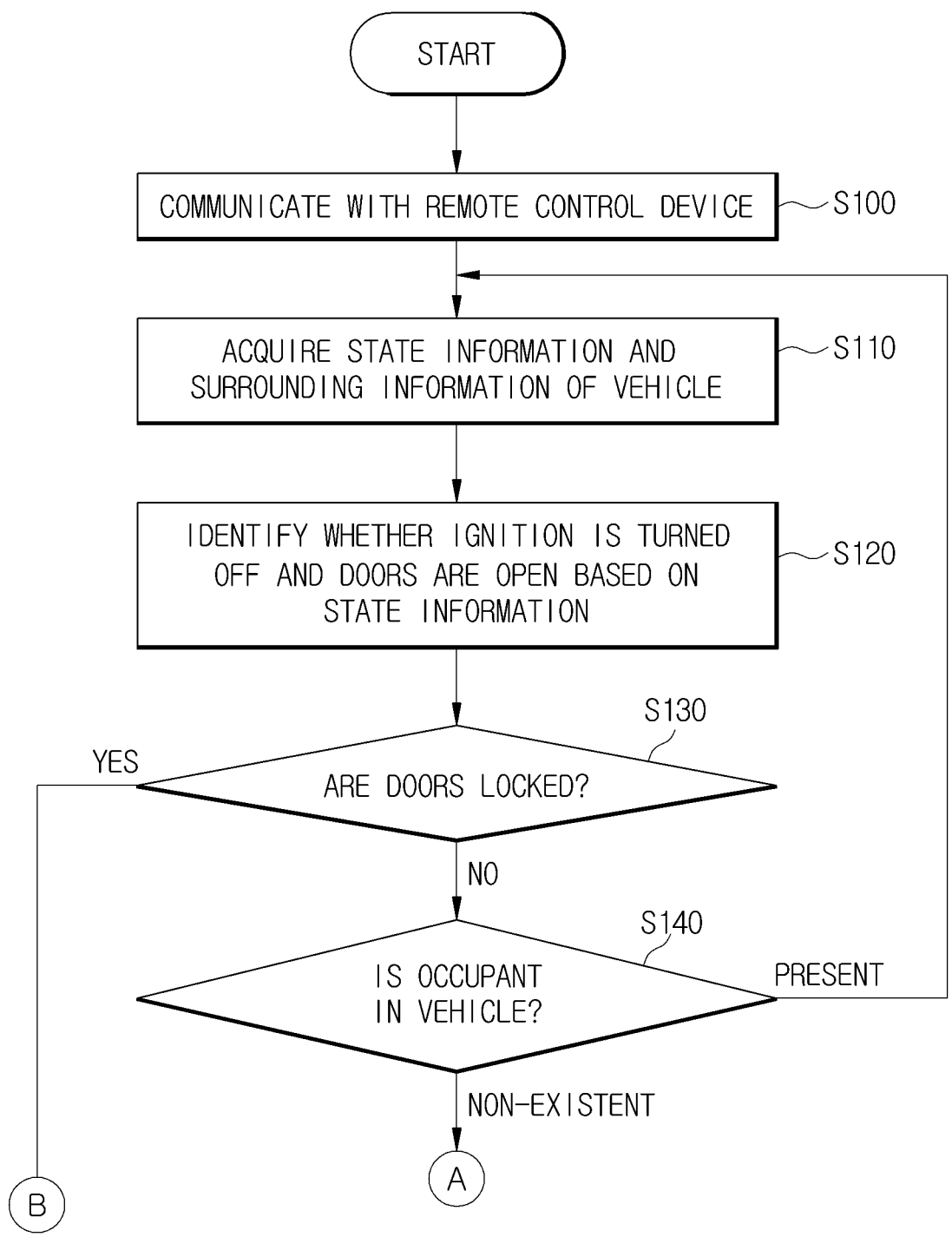
FIGS. 11A and 11B are flowcharts illustrating operations of a control method of a vehicle according to an exemplary embodiment.
Figure 11B:
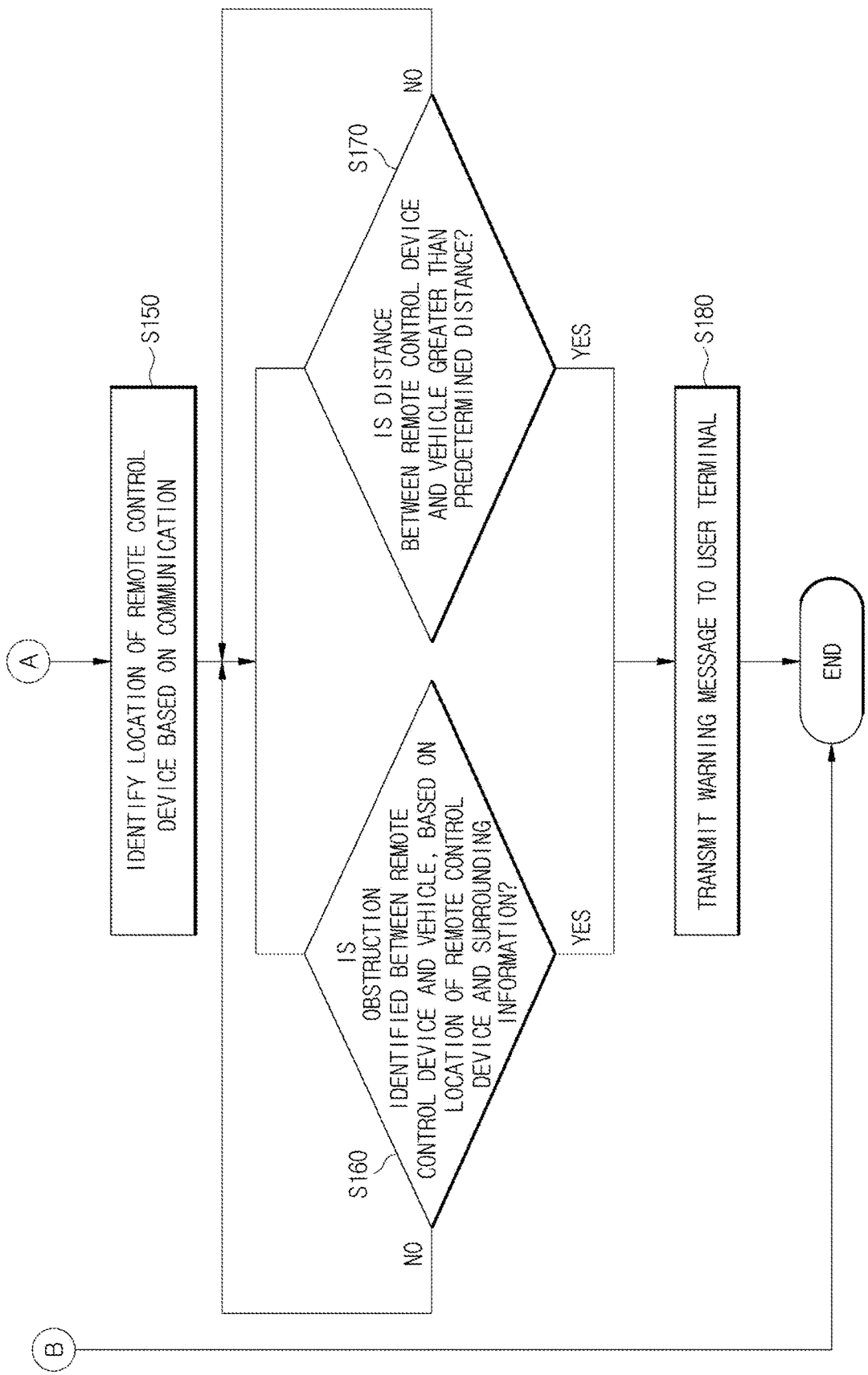

FIGS. 11A and 11B are flowcharts illustrating operations of a control method of a vehicle according to an exemplary embodiment.

Figure 12:
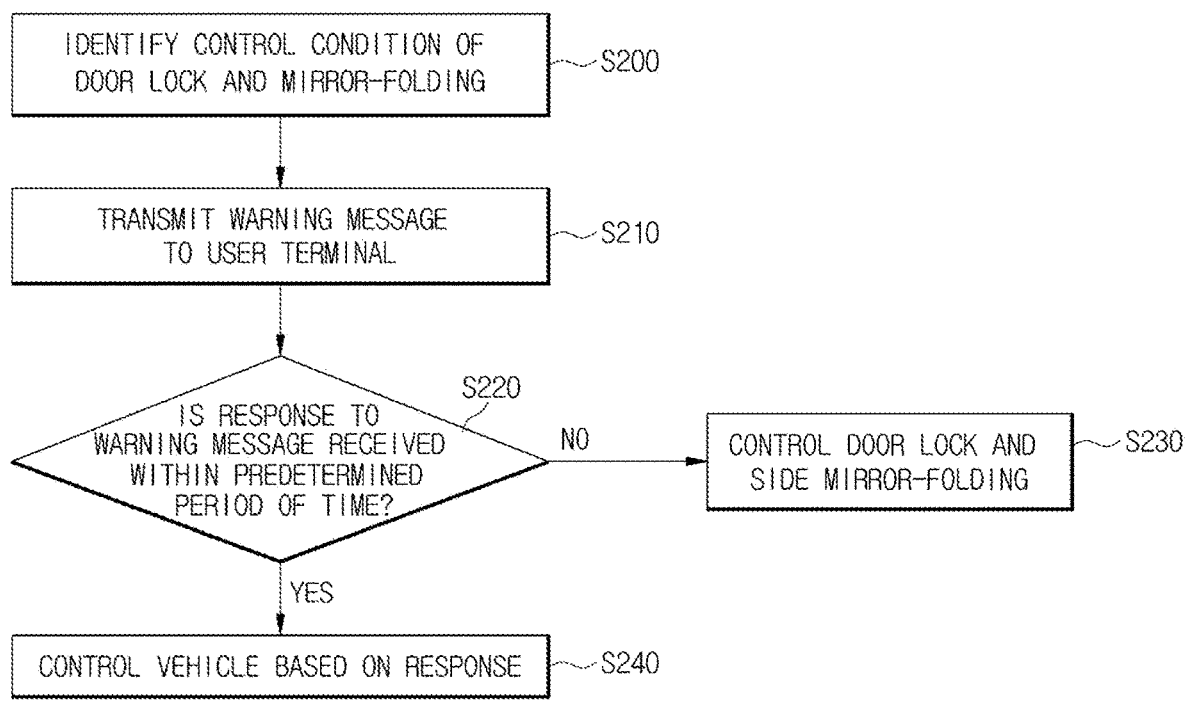
FIG. 12 is a flowchart illustrating operations of a control method of a vehicle according to an exemplary embodiment.

FIG. 12 is a flowchart illustrating operations of a control method of a vehicle according to an exemplary embodiment.

The control method of the vehicle shown in FIGS. 11A, 11B and 12 may be performed by the vehicle 10 described above. Accordingly, although omitted below, the above description with respect to the vehicle 10 may be equally applicable to the control method thereof.

Referring to FIGS. 11A and 11B, the vehicle 10 may be configured to communicate with the remote control device 100 and/or the user terminal 500 (S100).

Also, the vehicle 10 may be configured to acquire state information and surrounding information of the vehicle 10 (S110).

The vehicle 10 may be configured to identify whether an ignition of the vehicle 10 is turned off and the doors 15 of the vehicle 10 are open based on the state information of the vehicle 10 (S120).

The vehicle 10 may be configured to identify whether the doors 15 are locked based on the state information of the vehicle 10 (S130). Accordingly, the vehicle 10 may be configured to end a control process of the vehicle 10, in response to the doors 15 being locked, based on the identification of lock/unlock of the doors 15.

The vehicle 10 may be configured to identify whether an occupant is present in the vehicle based on the state information of the vehicle 10, in response to the doors 15 being unlocked based on the identification of lock/unlock of the doors 15 (S140).

Also, the vehicle 10 may be configured to perform an operation S110 again for acquiring the state information and surrounding information of the vehicle 10, in response to the occupant existing in the vehicle 10 (S140).

The vehicle 10 may be configured to identify a location of the remote control device 100 based on communication between the remote control device 100 and the vehicle 10, in response to the occupant not existing in the vehicle 10 (S150).

In response to the location of the remote control device 100 being identified, the vehicle may be configured to identify whether the obstruction 2 between the remote control device 100 and the vehicle 10 is identified based on the location of the remote control device 100 and the surrounding information of the vehicle 10 (S160), or the vehicle 10 may be configured to identify whether a distance between the remote control device 100 and the vehicle 10 is greater than a predetermined distance (S170).

In addition, in response to the obstruction 2 not being identified between the remote control device 100 and the vehicle 10, the vehicle 10 may be configured to identify whether the obstruction 2 between the remote control device 100 and the vehicle 10 is identified based on the location of the remote control device 100 and the surrounding information of the vehicle 10 (S160) again, or identify whether the distance between the remote control device 100 and the vehicle 10 is greater than the predetermined distance (S170) again.

Further, in response to the distance between the remote control device 100 and the vehicle being less than the predetermined distance, the vehicle 10 may be configured to identify whether the obstruction 2 between the remote control device 100 and the vehicle 10 is identified based on the location of the remote control device 100 and the surrounding information of the vehicle 10 (S160) again, or identify whether the distance between the remote control device 100 and the vehicle 10 is greater than the predetermined distance (S170) again.

In response to the obstruction 2 between the remote control device 100 and the vehicle 10 being identified or the distance between the remote control device 100 and the vehicle 10 being greater than the predetermined distance, the vehicle 10 may be configured to transmit a warning message to the user terminal 500 (S180).

Also, the vehicle 10 may be configured to end a control process of the vehicle 10, in response to the warning message being transmitted to the user terminal 500.

Referring to FIG. 12, the vehicle 10 may be configured to identify a control condition of door lock and mirror-folding (S200).

The vehicle 10 may be configured to transmit a warning message to the user terminal 500 (S210).

The vehicle 10 may be configured to identify whether a response to the warning message is received from the user terminal 500 within a predetermined period of time, in response to the warning message being transmitted to the user terminal 500 (S220).

The vehicle 10 may be configured to control the doors 15 of the vehicle 10 to be locked and the side mirrors 14 to be folded, in response to the response to the warning message not being received from the user terminal 500 within the predetermined period of time (S230).

In response to the response to the warning message being received from the user terminal 500 within the predetermined period of time, the vehicle 10 may be configured to control the vehicle 10 based on the response to the warning message (S240).

As is apparent from the above, according to the embodiments of the disclosure, the vehicle and the control method thereof may prevent a car theft and intrusion from outside by controlling the vehicle in an unsafe state such as disappearing from a view of a driver, even when the driver is close to the vehicle.

Embodiments may thus be implemented through computer readable code/instructions in/on a medium, e.g., a computer readable medium, to control at least one processing element to implement any above described exemplary embodiment. The medium may correspond to any medium/media permitting the storing and/or transmission of the computer readable code.

The computer-readable code may be recorded on a medium or transmitted through the Internet. The computer-readable medium may comprise read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle, comprising:
   a communicator configured to perform communication with a user terminal or a remote control device;
   a sensor configured to acquire surrounding information of the vehicle; and
   a controller comprising a processor configured to process the surrounding information,
   wherein the controller is configured to:
      identify a location of the remote control device based on the communication, and
      transmit a warning message to the user terminal when an obstruction is identified between the identified location of the remote control device and a location of the vehicle, based on processing the surrounding information.

2. The vehicle of claim 1, wherein:
   the sensor is configured to further acquire state information of the vehicle, and
   the controller is further configured to:
      identify whether doors of the vehicle are locked and whether an engine of the vehicle is stopped, based on processing the state information; and
      identify the location of the remote control device, in response to the engine being stopped and the doors being unlocked.

3. The vehicle of claim 1, wherein the controller is further configured to:
   identify a movement route of the remote control device based on the communication; and
   lock doors of the vehicle, in response to the identified movement route being in a direction away from the vehicle and a strength of the communication being less than a preset strength.

4. The vehicle of claim 3, wherein the controller is further configured to lock doors of the vehicle, in response to a state where the strength of the communication is less than the preset strength lasting longer than a predetermined period of time.

5. The vehicle of claim 1, wherein the controller is further configured to:
   assign a weight according to a size of the obstruction; and
   lock doors of the vehicle in response to the weight being greater than a preset value.

6. The vehicle of claim 1, wherein the controller is further configured to:
identify an object corresponding to the identified location of the remote control device, based on the identified location of the remote control device and the processed surrounding information; and
lock doors of the vehicle, in response to the identified object not being identified due to the obstruction.

7. The vehicle of claim 6, wherein:
the sensor comprise one or more of the following: a camera; a radar sensor; and a lidar sensor, and
the sensor is further configured to acquire the surrounding information of the vehicle.

8. The vehicle of claim 7, wherein the communication is performed based on at least one of:
an ultra wide band (UWB); a Bluetooth low energy (BLE); and a near field communication (NFC).

9. The vehicle of claim 1, wherein the controller is further configured to lock doors of the vehicle, in response to a response to the warning message not being received from the user terminal for a predetermined period of time.

10. A control method of a vehicle, the control method comprising:
performing communication with a user terminal or a remote control device;
acquiring, by a sensor, surrounding information of the vehicle;
identifying a location of the remote control device based on the communication;
identifying an obstruction between the identified location of the remote control device and a location of the vehicle, based on processing the surrounding information; and
transmitting a warning message to the user terminal.

11. The control method of claim 10, wherein:
the acquiring of the surrounding information further comprises acquiring state information of the vehicle,
the control method further comprises identifying whether doors of the vehicle are locked and whether an engine of the vehicle is stopped, based on processing the state information, and
the identifying of the location further comprises identifying the location of the remote control device, in response to the engine being stopped and the doors being unlocked.

12. The control method of claim 10, wherein:
the identifying of the location further comprises identifying a movement route of the remote control device, and
the control method further comprises locking doors of the vehicle, in response to the identified movement route being in a direction away from the vehicle and a strength of the communication being less than a preset strength.

13. The control method of claim 12, wherein the locking of the doors of the vehicle further comprises locking the doors of the vehicle, in response to a state where the strength of the communication is less than the preset strength lasting longer than a predetermined period of time.

14. The control method of claim 10, further comprising:
assigning a weight according to a size of the obstruction; and
locking doors of the vehicle in response to the weight being greater than a preset value.

15. The control method of claim 10, further comprising:
identifying an object corresponding to the identified location of the remote control device, based on the identified location of the remote control device and processing the surrounding information; and
locking doors of the vehicle, in response to the identified object not being identified due to the obstruction.

16. The control method of claim 15, wherein the acquiring of the surrounding information further comprises acquiring the surrounding information of the vehicle based on at least one of a camera, a radar sensor or a lidar sensor.

17. The control method of claim 16, wherein the performing of the communication is based on at least one of a UWB, a BLE or an NFC.

18. The control method of claim 10, further comprising locking doors of the vehicle, in response to a response to the warning message not being received from the user terminal for a predetermined period of time.

19. A non-transitory computer readable media on a computer readable medium storing a program for implementing the control method of claim 10.

\* \* \* \* \*